Nov. 16, 1948.   H. R. LONG   2,453,717
ALIGNING BAR
Filed Jan. 28, 1946
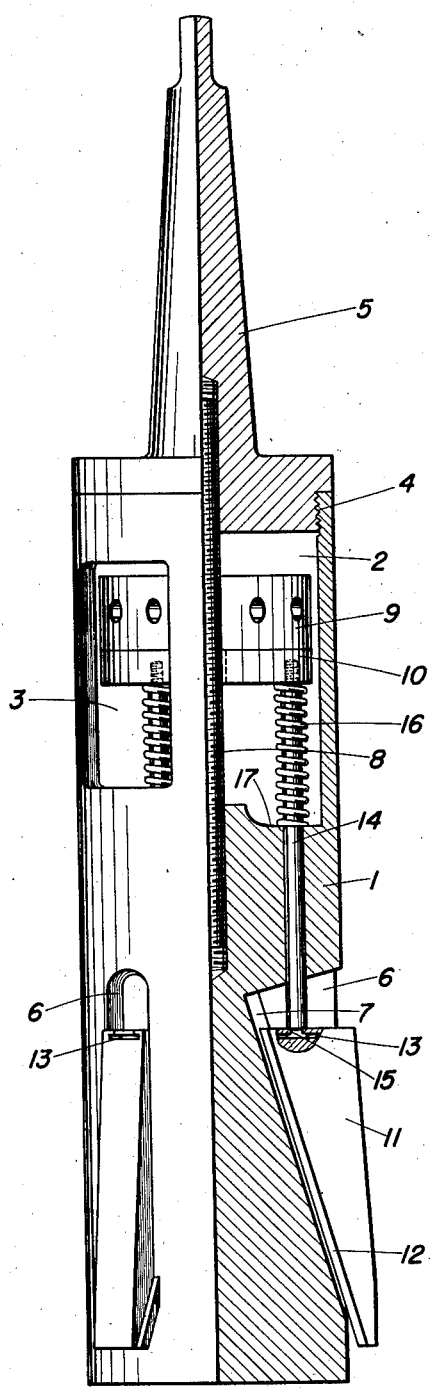
INVENTOR
HARRY R. LONG
BY M. O. Hayes
ATTORNEY Patented Nov. 16, 1948

2,453,717

UNITED STATES PATENT OFFICE 2,453,717

ALIGNING BAR

Harry R. Long, San Pedro, Calif.

Application January 28, 1946, Serial No. 643,953

2 Claims. (Cl. 279—2)

(Granted under the act of March 3, 1883, as amended April 30, 1928; 370 O. G. 757)

This invention relates to an aligning bar, and is more particularly concerned with a member of this character having expansible elements for engaging the inner surfaces of hollow objects and aligning the same.

It is an object of this invention to provide apparatus for aligning and centering workpieces having circular openings therein.

A further object is to provide an aligning apparatus of the character described which is adapted for use in connection with conventional lathes.

A still further object of this invention is to provide an aligning apparatus having elements which may be expanded outwardly to engage the surfaces of substantially circular openings in workpieces which it is desired be placed in the proper aligned position.

In accomplishing these and other objects of the present invention, I have provided improved details of structure, the preferred form of which is illustrated in the accompanying drawing, wherein:

The figure shown is a side elevational view, partially in section, of an aligning mechanism embodying the features of the subject invention.

Referring more in detail to the drawing:

The aligning bar illustrated has a substantially cylindrical support, or body portion, 1, one end of which is provided with a hollow portion 2. An access opening 3 is provided in the wall of the support adjacent the hollow portion 2. The interior surface of the support 1 is threaded at 4. A tapered shank 5, by which the aligning bar may be the more readily mounted in a positioning member such as a lathe chuck, (not shown), is mounted on the end of the cylinder, the shank element 5 having threads which cooperatively engage the threaded portion 4 of the support 1.

The side walls of the support 1 adjacent the end opposite that to which the shank 5 is mounted, are provided with a series of external, inclined, inverted T-shaped, parallel slots 6, each slot preferably extending longitudinally of the support 1. Each slot inclines upwardly toward the end opposite the shank of the support, the deeper end of the slot being that nearest the end having the shank 5. The undercut portions forming the T in slots 6 are indicated at 7. In the form of apparatus shown herein, three such slots are employed. However, any number greater than one of slots may be employed provided that the distance between adjacent slots does not exceed one-half the circumference of the portion of the cylindrical support in which the slots are cut.

Mounted axially of the support 1 within the opening 2 is a screw element 8, and threadably engaged on the screw 8 is a nut 9 accessible through the opening 3. A mounting plate 10, loosely movable over screw 8, is mounted on the screw adjacent the nut 9.

Slidably mounted within each of the slots 6 is a wedge 11 having a T-shaped portion 12 formed along the bottom side thereof for engagement with the corresponding portion 7 of each slot. The thicker end of each wedge 11 is positioned at the deeper end of each of the slots 6, and a T-slot 13 is formed radially from the aligning bar in the thicker end of each of the wedges. Rods 14, slidably mounted within parallel, longitudinal bores provided in the support 1, connect the mounting plate 10 and each of the wedges 11. The end of each of the rods 14 adjacent the plate 10 is threadedly connected thereto, while the rod end adjacent the wedge 11 is provided with an annular groove 15 whereby the said end of the rod is engaged to the T-shaped slot 13 in the wedge.

A compression spring 16 is mounted about each of the rods 14. This spring engages the plate 10 as well as the adjacent surface 17 of the support 1, thereby urging the plate 10 against the nut 9.

Operation

The operation of the aligning bar constructed as described is as follows:

The shank 5 of the bar is first positioned as desired such as within one of the chucks of a lathe, and the bar is then advanced to an operable position, with the wedges 11 withdrawn into the slots 6. This withdrawal is effected by turning the nut 9 toward the end of the screw 8 adjacent the shank 5. Under the action of the compression spring 16, the mounting plate 10 is caused to follow the nut 9, thereby retracting the wedges 11 into the slots 6 through the action of the connecting rods 14. If, for example, a hollow coupling is the workpiece which is to be aligned, the end of the support 1 bearing the wedges 11 is then advanced within the opening in the coupling. The nut 9 is then turned in such a direction as to be carried by the screw 8 toward the wall 17, thereby extending the wedges 11 from the slots 6. This action is continued until the wedges engage the periphery of the opening in the coupling. The aligning bar then holds the coupling firmly in the desired aligned position while the coupling is properly affixed to the opposite lathe chuck or other work engaging face of the lathe. The coupling may then be turned, if desired, along with the aligning bar, as work is performed on the coupling.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. An aligning bar comprising a cylindrical support having a hollow portion adjacent one end thereof, an access opening in a side wall adjacent said hollow portion, a plurality of inclined, parallel slots formed longitudinally about the periphery of said support along a portion adjacent the other end thereof, said slots being inclined upwardly toward said second mentioned end, and a plurality of longitudinal, parallel bores, extending between said hollow portion and midportions of the adjacent ends of said slots; a screw element axially mounted within said support and extending through the hollow portion thereof; a nut threaded on said screw; a wedge slidably mounted within each of said slots and having its thicker end positioned at the deeper end of the slot; and rods slidably mounted within said bores, one end of each said rods being slidably mounted within the thicker end of an adjacent wedge, and the other end of each rod being in controlled relationship to the said nut.

2. An aligning bar comprising a cylindrical support having a plurality of inclined, parallel slots formed longitudinally about the periphery thereof, and a series of longitudinal openings therein communicating between the deeper end of each of the said slots and the adjacent end of the support; wedges slidably mounted within the slots and having their thicker ends positioned at the deeper ends of the slots; a screw mounted axially within said support; a nut threadably mounted on said screw; and connecting means between said nut and said wedges, said connecting means extending through said openings, and slidably engaging said nut and said wedges, whereby said wedges may be retracted or extended from the support.

HARRY R. LONG.

REFERENCES CITED

The following references are of record in the file of this patent:

UNITED STATES PATENTS

| Number | Name | Date |
|---|---|---|
| 662,835 | Thomas | Nov. 27, 1900 |
| 1,930,669 | Varcoe et al. | Oct. 17, 1933 |
| 2,379,210 | Alyea | June 26, 1945 |

FOREIGN PATENTS

| Number | Country | Date |
|---|---|---|
| 120,134 | Great Britain | Oct. 31, 1918 |
| 512,178 | France | Jan. 17, 1921 |